(12) United States Patent
Ganju et al.

(10) Patent No.: US 12,182,075 B2
(45) Date of Patent: Dec. 31, 2024

(54) SYSTEMS AND METHODS FOR INTELLIGENT DATA COMPRESSION

(71) Applicant: Mellanox Technologies, Ltd., Yokneam (IL)

(72) Inventors: Siddha Ganju, Santa Clara, CA (US); Itamar Frenkel, Yokneam (IL); Elad Mentovich, Tel Aviv (IL); Rotem Barzilai, Yokneam (IL); Yaakov Gridish, Yoqneam (IL)

(73) Assignee: Mellanox Technologies, Ltd., Yokneam (IL)

( * ) Notice: Subject to any disclaimer, the term of this patent is extended or adjusted under 35 U.S.C. 154(b) by 89 days.

(21) Appl. No.: 18/092,696

(22) Filed: Jan. 3, 2023

(65) Prior Publication Data

US 2024/0220455 A1    Jul. 4, 2024

(51) Int. Cl.
    *G06F 16/174*     (2019.01)
    *G06N 20/10*     (2019.01)

(52) U.S. Cl.
    CPC ......... *G06F 16/1744* (2019.01); *G06N 20/10* (2019.01)

(58) Field of Classification Search
    CPC .......................... G06F 16/1744; G06N 20/10
    See application file for complete search history.

(56) References Cited

U.S. PATENT DOCUMENTS

| | | | |
|---|---|---|---|
| 2014/0248002 A1* | 9/2014 | Thakkar | G06F 16/2291 |
| | | | 382/305 |
| 2019/0114678 A1* | 4/2019 | Touil | G06Q 30/0254 |
| 2019/0124045 A1* | 4/2019 | Zong | G06N 7/01 |
| 2021/0049495 A1* | 2/2021 | King | G06N 20/00 |
| 2021/0203479 A1 | 7/2021 | Pismenny et al. | |
| 2022/0174342 A1* | 6/2022 | Gershey | H04N 21/25891 |
| 2022/0222583 A1* | 7/2022 | Wouhaybi | H04L 67/52 |
| 2022/0253725 A1* | 8/2022 | Feng | G06N 20/00 |
| 2023/0169147 A1* | 6/2023 | Sivakumar | G06N 5/02 |
| | | | 382/159 |
| 2023/0289276 A1* | 9/2023 | Kozhaya | G06F 11/3409 |

(Continued)

OTHER PUBLICATIONS

Related U.S. Appl. No. 17/874,802, filed Jul. 27, 2022, entitled "High Performance Mechanism for Exporting Peripheral Services and Offloads Using Direct Memory Access (DMA) Engine".

(Continued)

*Primary Examiner* — Huawen A Peng
(74) *Attorney, Agent, or Firm* — R. W. McCord Rayburn; Moore & Van Allen PLLC

(57) ABSTRACT

Systems, computer program products, and methods are described herein for intelligent data compression, in accordance with an embodiment of the invention. The present invention may be configured to receive a plurality of files for storage in a database and perform a series of steps iteratively, for each file of the plurality of files, and until each file of the plurality of files is represented in the database. The series of steps may include identifying one or more data points in the respective file, where each identified data point was previously unidentified in the database and adding the identified one or more data points to the database. The series of steps may also include identifying one or more features of the respective file for storage in the database and storing the identified one or more features in the database as a surrogate for the respective file.

20 Claims, 6 Drawing Sheets

(56) References Cited

U.S. PATENT DOCUMENTS

2024/0005218 A1* 1/2024 Chan ................... G06F 18/2115
2024/0119303 A1* 4/2024 Sharpe .................. G06N 3/096

OTHER PUBLICATIONS

Related U.S. Appl. No. 17/863,779, filed Jul. 13, 2022, entitled "Systems, Methods, and Apparatuses for Securing Ownership of Objects in a Digital Ledger".
Related U.S. Appl. No. 17/644,470, filed Dec. 15, 2021, entitled "Systems, Methods, and Apparatuses for Making Writes to Persistent Memory".
Related U.S. Appl. No. 17/584,914, filed Jan. 26, 2022, entitled "Active Learning of Product Inspection Engine".
Related U.S. Appl. No. 17/807,444, filed Jun. 17, 2022, entitled "Component, Assembly, and Usage Perspicacity Model and Uses Thereof".

* cited by examiner

SYSTEMS AND METHODS FOR INTELLIGENT DATA COMPRESSION

FIELD OF THE INVENTION

The present invention relates to systems and methods for intelligent data compression.

BACKGROUND

Data intake systems may receive files for storage in one or more databases and may process the files (e.g., to detect errors in the data, remove duplicative data, and/or the like) before storing them in the databases. For example, a data intake system may receive files from multiple different sources (e.g., other systems, user devices, other databases, and/or the like) and perform one or more data cleaning processes on the files before storing the files in an appropriate database.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention is directed to a system for intelligent data compression. The system may include at least one processing device and at least one non-transitory storage device including computer-executable program code that, when executed by the at least one processing device, causes the at least one processing device to receive a plurality of files for storage in a database. Each file of the plurality of files may include data. The at least one non-transitory storage device of the server may include computer-executable program code that, when executed by the at least one processing device, causes the at least one processing device to perform a series of steps iteratively, for each file of the plurality of files and until identified one or more features of each file of the plurality of files has been stored in the database. The series of steps may include identifying (e.g., using a first machine learning model) one or more data points in the respective file, where each identified data point was previously unidentified with respect to a stored file in the database and adding the identified one or more data points to the database. The series of steps may also include identifying (e.g., using a second machine learning model) one or more features of the respective file for storage in the database and storing the identified one or more features in the database as a surrogate for the respective file.

In some embodiments, the first machine learning model may be an unsupervised machine learning model.

In some embodiments, the first machine learning model may be a one-class support vector machine trained using a radial basis function kernel.

In some embodiments, the second machine learning model may be an unsupervised machine learning model.

In some embodiments, the second machine learning model may be a ridge regression model, an elastic net regression model, a least squares regression model, and/or the like.

In some embodiments, the plurality of files may be a second plurality of files, and the at least one non-transitory storage device of the server may include computer-executable program code that, when executed by the at least one processing device, causes the at least one processing device to, before receiving the second plurality of files, receive a first plurality of files for storage in the database. The at least one non-transitory storage device of the server may include computer-executable program code that, when executed by the at least one processing device, causes the at least one processing device to identify data points in each of the first plurality of files and add the identified data points to the database. The at least one non-transitory storage device of the server may include computer-executable program code that, when executed by the at least one processing device, causes the at least one processing device to identify features in each of the first plurality of files and store, for each of the first plurality of files, the identified features in the database as a surrogate for the respective file.

In some embodiments, the at least one non-transitory storage device of the server may include computer-executable program code that, when executed by the at least one processing device, causes the at least one processing device to, before receiving the second plurality of files, train the first machine learning model using data in the database to determine whether subsequent data points are previously unidentified data points.

In some embodiments, training the first machine learning model to determine whether subsequent data points are previously unidentified data points may include training the first machine learning model to determine, based on data in the database, a likelihood of a data point being previously unidentified, determine whether the likelihood satisfies a threshold, and identify, based on the likelihood satisfying the threshold, that the data point is a previously unidentified data point.

In some embodiments, the at least one non-transitory storage device of the server may include computer-executable program code that, when executed by the at least one processing device, causes the at least one processing device to, after a surrogate for each file of the second plurality of files is stored in the database and using the identified data points of the first plurality of files and the identified data points of the second plurality of files, retrain the first machine learning model to determine whether subsequent data points are previously unidentified data points.

In some embodiments, the at least one non-transitory storage device of the server may include computer-executable program code that, when executed by the at least one processing device, causes the at least one processing device to, before receiving the second plurality of files, train the second machine learning model using data in the database to determine whether subsequent features should be stored in the database.

In some embodiments, training the second machine learning model to determine whether subsequent features should be stored in the database may include training the second machine learning model to determine, based on data in the database, a likelihood of a feature being previously unidentified, determine whether the likelihood satisfies a threshold, and determine, based on the likelihood satisfying the threshold, that the feature should be stored in the database.

In some embodiments, the at least one non-transitory storage device of the server may include computer-executable program code that, when executed by the at least one processing device, causes the at least one processing device to, after a surrogate for each file of the second plurality of files is stored in the database and using the identified features of the first plurality of files and the identified features of the second plurality of files, retrain the second machine learning model to determine whether subsequent features should be stored in the database.

In some embodiments, the files may include high-resolution image files, and storing the identified one or more features in the database as a surrogate for the file may include storing (i) a lower resolution image file and/or an image identifier corresponding to the file and (ii) metadata including the identified one or more features.

In some embodiments, the at least one non-transitory storage device of the server may include computer-executable program code that, when executed by the at least one processing device, causes the at least one processing device to receive an indication of an error associated with a file of the plurality of files, identify, using a third machine learning model, other files in the database associated with the error, generate a report including the other files and the identified one or more features of the other files, and provide the report to a user.

In some embodiments, the high-resolution image files may include images captured by one or more cameras of an autonomous vehicle, and the metadata may include a number of people identified in each image, a number of objects identified in each image, a number of vehicles identified in each image, and/or the like.

In some embodiments, the high-resolution image files may include images captured by a microscope of a plurality of cells, and the metadata may include a number of cells identified in each image, a wavelength of light used to capture each image, an identifier of the microscope, and/or the like.

In some embodiments, the high-resolution image files may include images of wafer devices, and the metadata may include a step of manufacturing during which an image was captured, a defect identified in the wafer device, a location of a defect identified in the wafer device, a type of defect identified in the wafer device, and/or the like.

In another aspect, the present invention is directed to a method for intelligent data compression. The method may include receiving a first plurality of files for storage in a database, identifying, in each of the first plurality of files, data points, and adding the identified data points to the database. The method may also include identifying, in each of the first plurality of files, features and storing, for each of the first plurality of files, the identified features in the database as a surrogate for the respective file. The method may further include receiving a second plurality of files for storage in the database and performing a series of steps iteratively, for each file of the second plurality of files and until each file of the second plurality of files is represented in the database. The series of steps may include identifying (e.g., using a first machine learning model) one or more data points in the respective file, where each identified data point was previously unidentified with respect to a stored file in the database, and adding the identified one or more data points to the database. The series of steps may also include identifying (e.g., using a second machine learning model) one or more features of the respective file for storage in the database and storing the identified one or more features in the database as a surrogate for the respective file.

In some embodiments, the first machine learning model may be an unsupervised, one-class support vector machine trained using a radial basis function kernel, and the second machine learning model may be an unsupervised, ridge regression model.

In some embodiments, the method may include, before receiving the second plurality of files, training the first machine learning model using data in the database to determine whether data points are previously unidentified data points and training the second machine learning model using data in the database to determine whether features should be stored in the database.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
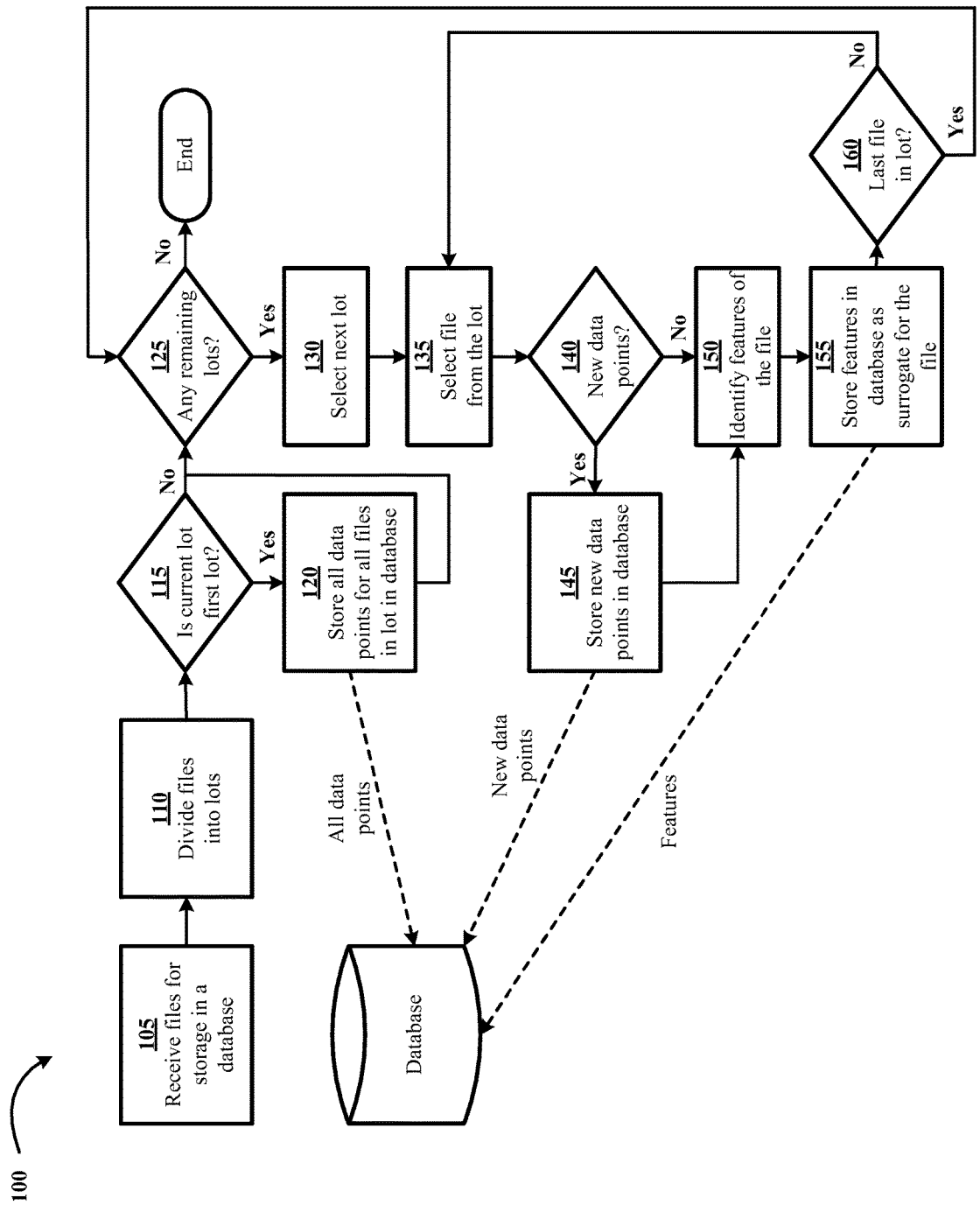
Figure 2:
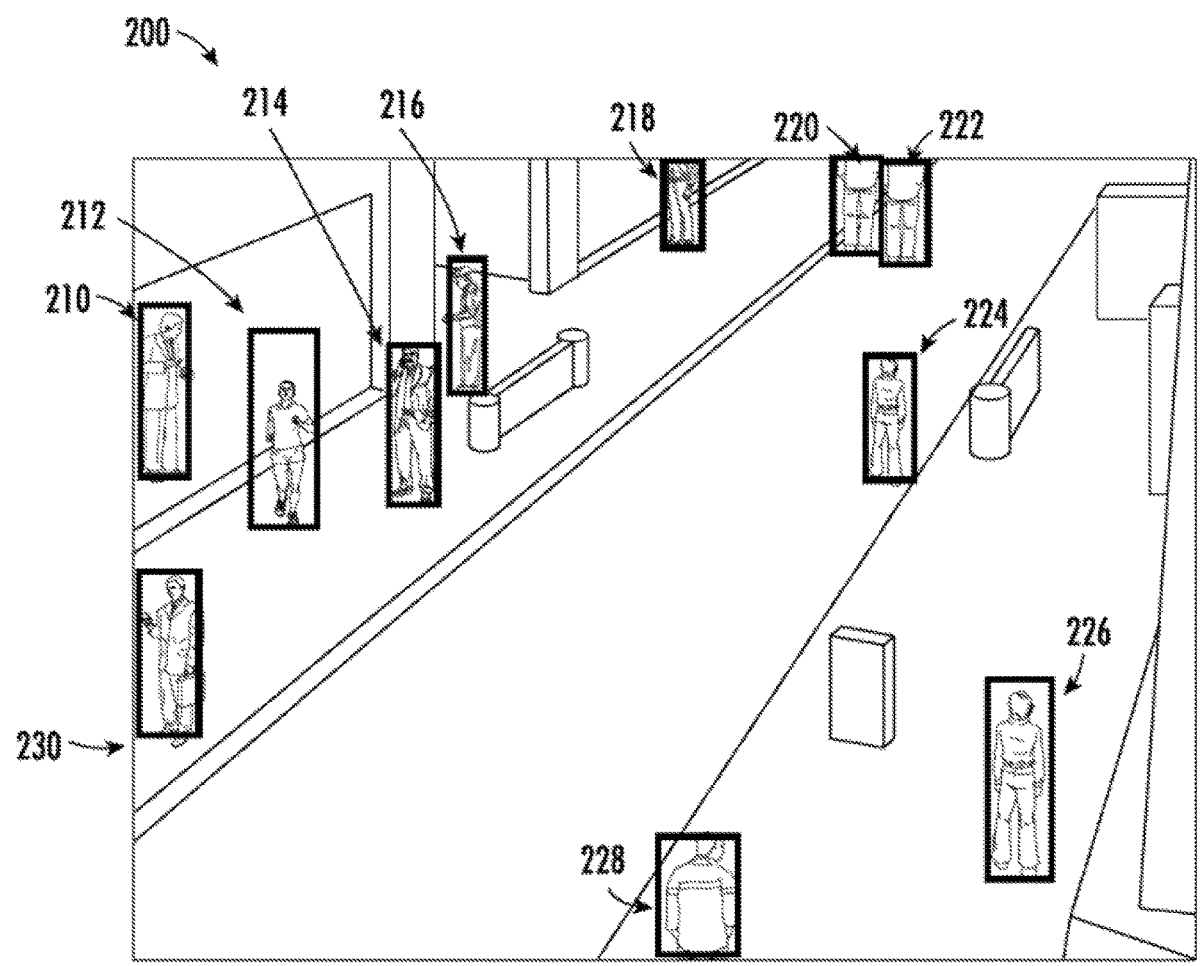
Figure 3:
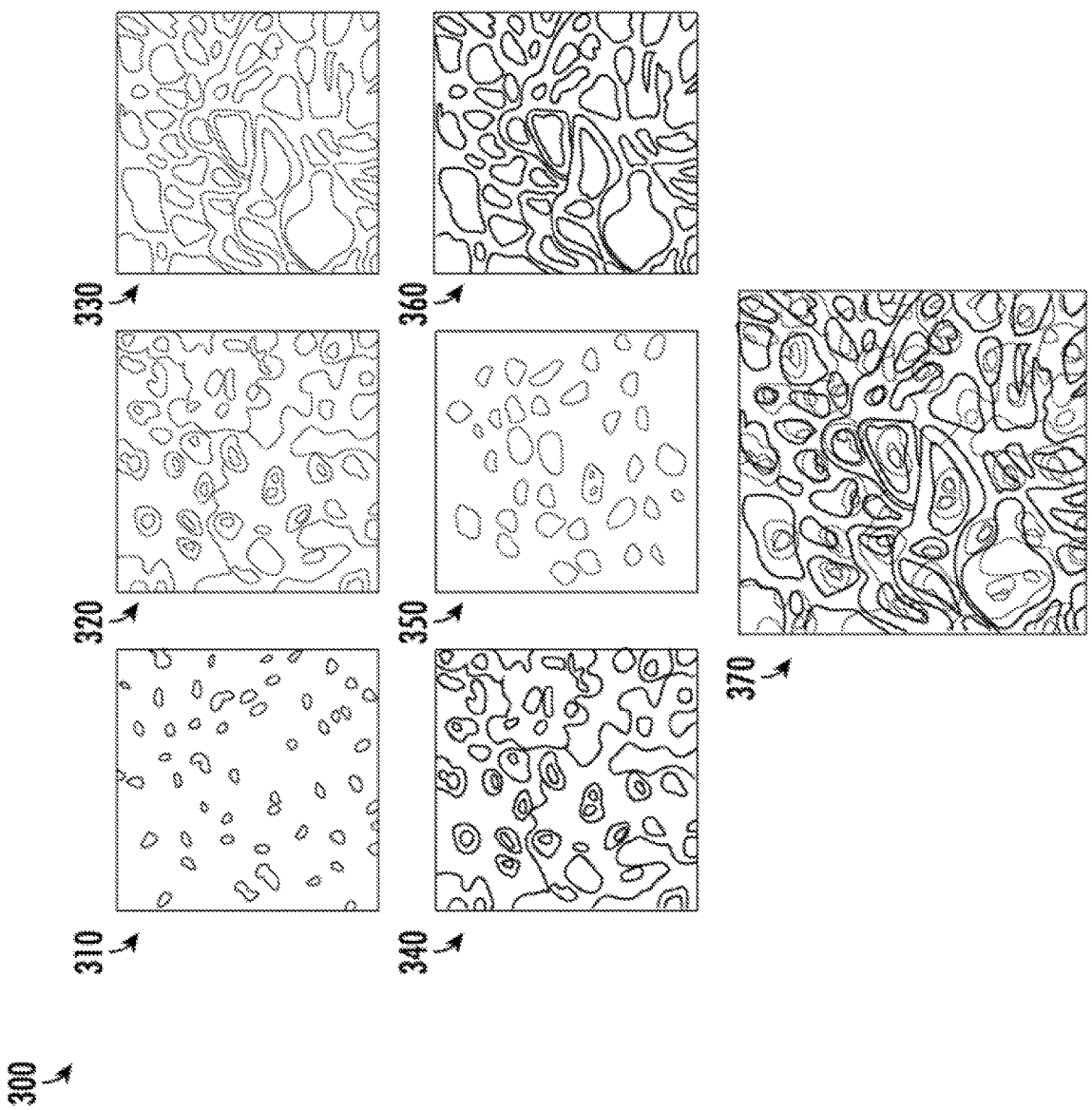
Figure 4:
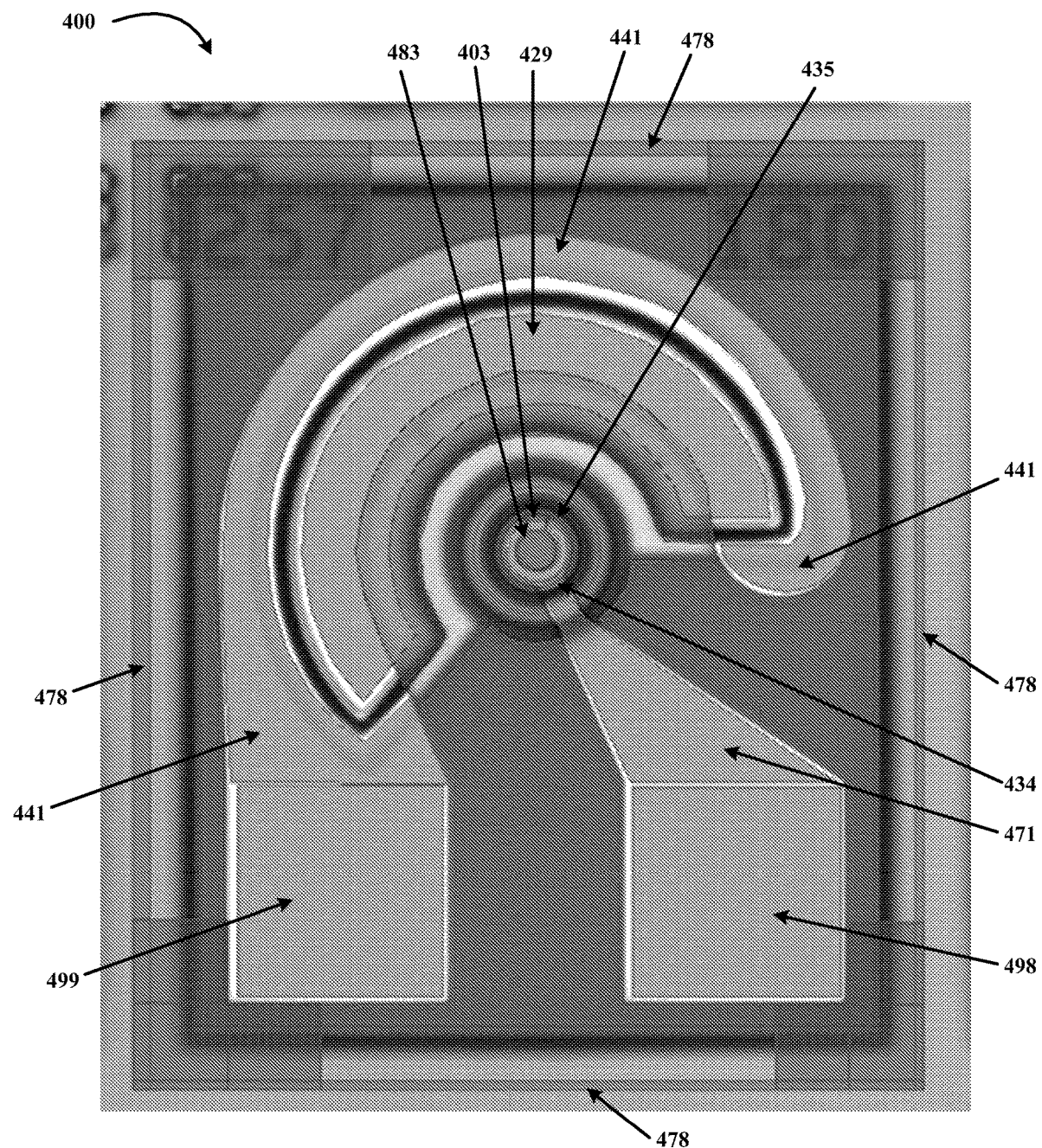
Figure 5:
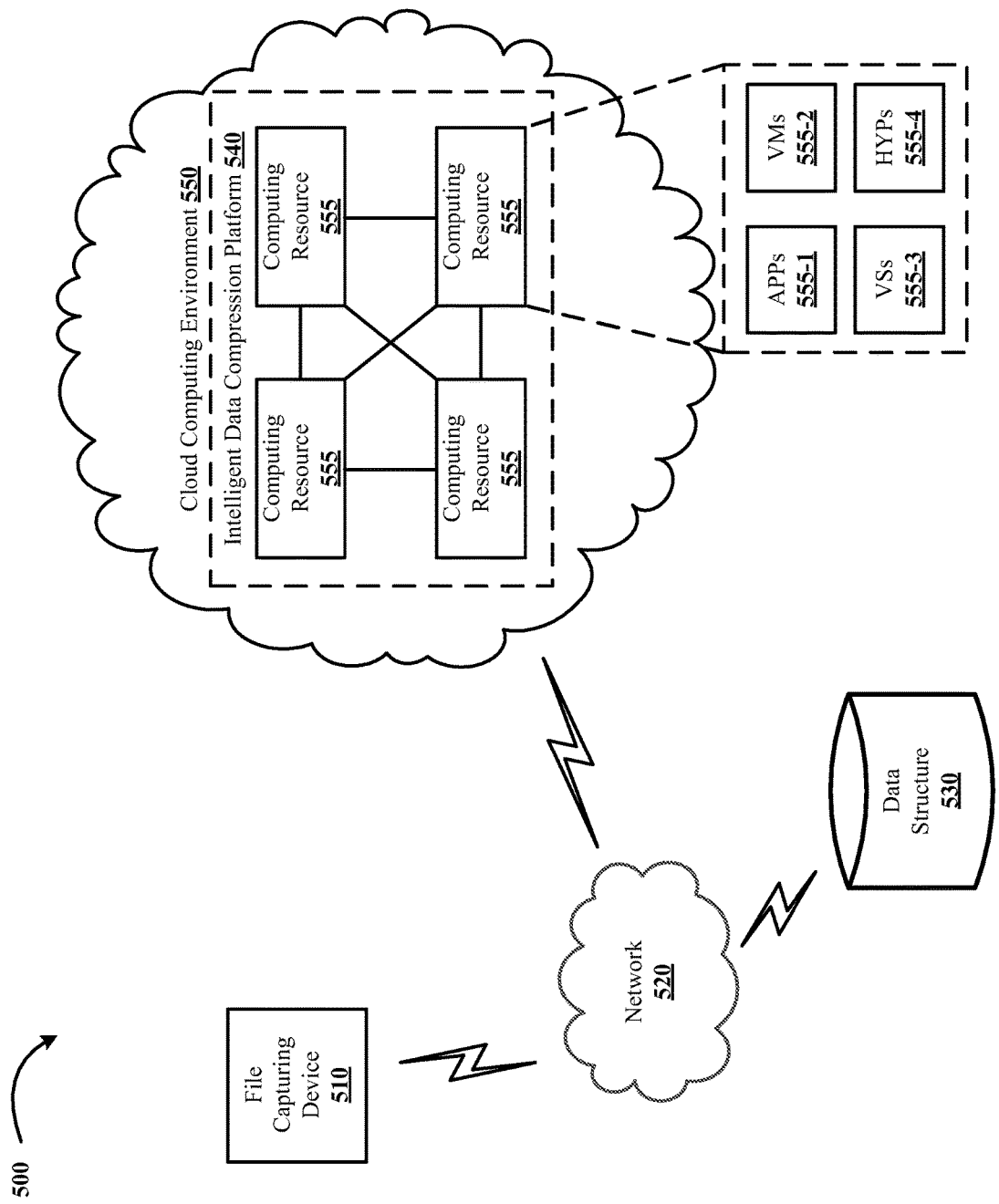
Figure 6:
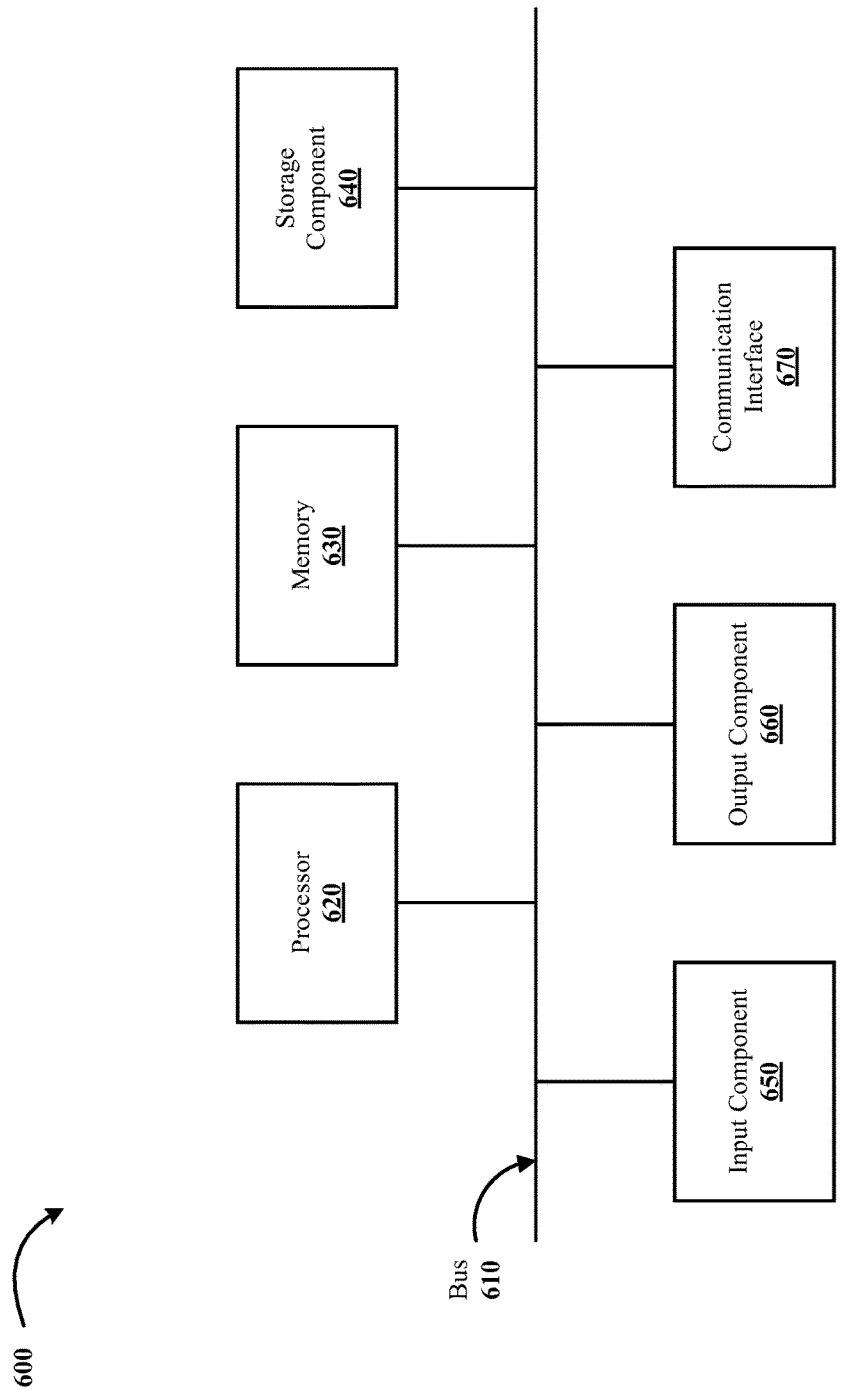

Having thus described embodiments of the invention in general terms, reference will now be made the accompanying drawings, wherein:

FIG. 1 illustrates a process flow for intelligent data compression, in accordance with an embodiment of the invention;

FIG. 2 illustrates an example file for storage in a database, in accordance with an embodiment of the invention;

FIG. 3 illustrates another example file for storage in a database, in accordance with an embodiment of the invention;

FIG. 4 illustrates another example file for storage in a database, in accordance with an embodiment of the invention;

FIG. 5 illustrates a system environment for intelligent data compression, in accordance with an embodiment of the invention; and FIG. 6 is a diagram of example components of one or more devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Furthermore, when it is said herein that something is "based on" something else, it may be based on one or more other things as well. In other words, unless expressly indicated otherwise, as used herein "based on"

means "based at least in part on" or "based at least partially on." Also, as used herein, the term "or" is intended to be inclusive when used in a series and may be used interchangeably with "and/or," unless explicitly stated otherwise (e.g., if used in combination with "either" or "only one of"). Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like. Like numbers refer to like elements throughout. No element, act, or instruction used herein should be construed as critical or essential unless explicitly described as such.

As noted, data intake systems may receive files from multiple different sources (e.g., other systems, user devices, other databases, and/or the like) and perform one or more data cleaning processes on the files before storing the files in an appropriate database. However, the files may consume significant memory resources, particularly when each file itself consumes a large amount of memory resources. For example, the files may include image files, test data files, tabular data files, and/or the like, each of which may consume significant memory resources. Furthermore, when downstream systems attempt to access the files (e.g., for processing, for further analysis, for storage in another database, and/or the like), such access consumes additional computing resources (e.g., processing resources, memory resources, power resources, communication resources, and/or the like) and/or network resources due to the size of the files.

Some embodiments described herein provide a system, a computer program product, and/or a method for intelligent data compression. For example, a system may intelligently compress large files, large data sets, and/or the like for storage by identifying new and/or important data points and features within the files as compared to previously stored files or data. As an initial step, data points for a first lot of files (e.g., a first batch of files) may be added to a database, and then features of the first lot of files may be identified and stored in the database. In some embodiments, two machine learning models may be trained using the data in the database, one model for identifying new data points and another model for identifying features of files. The system may intake a second lot of files (e.g., a second batch of files) and use the machine learning models to identify new data points in the second lot of files and identify features that should be stored in the database. The system may add the new data points to the database and store the features in the database (e.g., as a surrogate for a file, without storing the file itself). By only adding new data points to the database and identifying and storing only the features that need to be stored in the database, the system reduces the amount of storage resources required to store the data from the files in the database without losing data that may be important for later use or use by downstream systems.

In some embodiments, the system may initially use a rule-based model, a supervised model, and/or the like to identify new data points. Additionally, or alternatively, the system may use a self-supervised model, an active learner-based model, a reinforcement learning based model, and/or the like to identify new data points. In some embodiments, after processing one or more initial batches of files, the system may use an unsupervised, one-class support vector machine trained using a radial basis function kernel to identify new data points. Additionally, or alternatively, the system may use an unsupervised, ridge regression model, an elastic net regression model, a least squares regression model, and/or the like to identify the features that should be stored. The system may also retrain the machine learning models after receiving and processing a new batch of files to further improve their performance.

The files may include high-dimensional distribution data or high-resolution image data (e.g., images from autonomous vehicles, images from microscopes or telescopes, images of wafer devices, and/or the like) and associated data (e.g., data derived from the images, such as counts of objects in the images, types of defects in the images, locations of defects in the images, and/or the like). As an example, rather than storing a high-resolution image file, which has a large file size, the system may store a lower resolution image file or an image identifier as well as metadata including one or more features identified by the machine learning model. In this example case of a high-resolution image file, the one or more features identified by the machine learning model with respect to the file may be the counts of objects in the images, the types of defects in the images, or the locations of defects in the images.

FIG. 1 illustrates a process flow 100 for intelligent data compression, in accordance with an embodiment of the invention. In some embodiments, one or more intelligent data compression systems (e.g., similar to the intelligent data compression system described herein with respect to FIG. 5) may perform one or more of the steps of the process flow 100.

As shown in block 105, the process flow 100 may include receiving files for storage in a database. For example, an intelligent data compression system may receive a plurality of files for storage in a data structure (e.g., a database, an array, a linked list, a record, a hash table, and/or the like) from one or more file capture and/or generating devices, one or more other systems (e.g., executing one or more applications), one or more other data structures, and/or the like. As noted, in some embodiments, the files may include high-dimensional distribution data, high-resolution image files, and/or other types of files that require a large amount of memory resources as well as associated data. For example, the files may be high-resolution image files, such as images from autonomous vehicles, images from microscopes or telescopes, images of wafer devices, and/or the like and associated data (e.g., data derived from the images, counts of objects in the images, types of defects in the images, locations of defects in the images, and/or the like). As another example, the files may include data results from chemical analysis of one or more objects (e.g., cells, tissue samples, minerals, products, and/or the like).

As shown in block 110, the process flow 100 may include dividing the files into lots (e.g., batches of files). For example, an intelligent data compression system may divide the files into lots. In some embodiments, the process flow 100 may include dividing the files into lots, where each lot has a same number of files, a same total lot size (e.g., a total amount of memory resources required to store the files in the lot), a similar type of file in the lot, and/or the like. Additionally, or alternatively, the process flow 100 may include dividing the files into lots based on the system and/or device that generated the files, that provided the files to the intelligent data compression system, and/or the like. In some embodiments, the process flow 100 may include dividing the files into lots based on a similarity of the files, a difference of the files, a source that generated the files, a user and/or network from which the files were obtained, and/or the like. For example, for image files and/or files including images, the process flow 100 may include dividing the files into lots based on similar tags, related tags, and/or the like, and the process flow 100 may include dividing the files into lots using one or more distance metrics (e.g., a Euclidean distance and/or the like). As another example, one or more users may manually divide the files into lots or provide a system with instructions for dividing the files into lots.

As shown in block 115, the process flow 100 may include determining if the current lot is a first lot. For example, the intelligent data compression system may determine whether the current lot is the first lot of files to be processed (e.g., compressed) for storage in the database. In some embodiments, the process flow 100 may determine if the current lot is the first lot by determining whether any files are currently stored in the database.

As shown in block 120, the process flow 100 may include, based upon determining that the current lot is the first lot, storing in the database all data points for all files in the first lot. For example, the intelligent data compression system may, after determining that the current lot is the first lot of files to be processed for storage in the database, store all of the data points in the database for all of the files in the first lot. In some embodiments, and as shown in FIG. 1, the process flow 100 may include continuing to block 125 after storing all data points for all files in the first lot in the database. As an example, for files of tabular data, storing all of the data points for all of the files may include storing every column, every row, and/or the like of the files in the database.

As shown in block 125, the process flow 100 may include determining if there are any remaining lots of files. For example, an intelligent data compression system may determine if there are any remaining lots of files, from the files that were received and divided into lots, that have not been processed, compressed, and/or stored in the database. In some embodiments and as shown in FIG. 1, the process flow 100 may end if there are no remaining lots.

As shown in block 130, the process flow 100 may include selecting the next lot of files. For example, an intelligent data compression system may select, from the files that were received and divided into lots, the next lot of files for processing, compression, and/or storage in the database.

As shown in block 135, the process flow 100 may include selecting a file from the next lot. For example, an intelligent data compression system may select, from the files in the next lot, selected in block 130, a file for processing, compression, and/or storage in the database.

As shown in block 140, the process flow 100 may include determining whether the file selected from the next lot includes new data points. For example, an intelligent data compression system may determine whether the file selected from the next lot includes new data points as compared to files previously stored in the database. In some embodiments involving files of tabular data, determining whether a file has new data points may include determining whether a file includes a new column and/or a new row that was previously unidentified with respect to files stored in the database. Additionally, or alternatively, for files including test results, determining whether a file has new data points may include determining whether a file includes one or more results from one or more new tests as compared to test results in previously stored files in the database.

In some embodiments, the process flow 100 may include identifying, using a machine learning model, one or more data points in the respective file, where each identified data point was previously unidentified with respect to a stored file in the database. For example, the machine learning model may be an unsupervised machine learning model. As another example, the machine learning model may be a one-class support vector machine trained using a radial basis function kernel. Additionally, or alternatively, the process flow 100 may include using Siamese networks to identify one or more data points in the respective file.

In some embodiments, the process flow 100 may include training the machine learning model using data in the database to determine whether data points (e.g., subsequent data points) are previously unidentified data points. For example, the machine learning model may be trained using the data from the first lot of files. In some embodiments, the process flow 100 may include training the machine learning model to determine, based on data in the database, a likelihood of a data point being previously unidentified, determine whether the likelihood satisfies a threshold, and identify, based on the likelihood satisfying the threshold, that the data point is a previously unidentified data point. Additionally, or alternatively, the process flow 100 may include, after a respective lot of files has been stored in the database, retraining the machine learning model to determine whether data points (e.g., subsequent data points) are previously unidentified data points using the data in the database.

In some embodiments, the process flow 100 may include using the data to train the machine learning model to determine the threshold, where the threshold corresponds to how similar or different two data points are. Because the threshold is adjustable, in some embodiments, a higher threshold may result in the process flow 100 determining that a first data point is a previously unidentified data point even though the first data point is very similar to a second data point that was previously identified. Additionally, or alternatively, a lower threshold may result in the process flow 100 determining that a first data point is not a previously unidentified data point even though the first data point is not very similar to a second data point that was previously identified.

In some embodiments, the process flow 100 may include using Siamese networks to determine whether data points are previously unidentified data points. For example, after training on data, the Siamese networks may learn to determine what makes two data points the same. In some embodiments, the Siamese networks may use cosine similarity as a metric to determine similarity. Additionally, or alternatively, the process flow 100 may include training the Siamese networks using triplet loss with margin alpha. In some embodiments, one-shot learning may be used at inference time.

As shown in block 145, the process flow 100 may include storing, based on determining that the file includes new data points, the new data points in the database. For example, an intelligent data compression system may, after determining that the file includes new data points, store the new data points in the database. In some embodiments, storing the new data points in the database may include adding one or more columns, one or more rows, and/or the like to the database.

As shown in block 150, the process flow 100 may include identifying features of the file. For example, an intelligent data compression system may identify the features of the file. In some embodiments, the process flow 100 may include identifying the features of the file after determining that the file includes new data points and storing the new data points in the database. Additionally, or alternatively, the process flow 100 may include identifying the features of the file after determining that the file does not include new data points. For embodiments including files of tabular data, the features of the file may be the values in the cells of the tabular data. As another example, embodiments including image files, the features may include resolutions of the images, wavelengths of light used to capture the images, identifiers of cameras used to capture the images, identifications of objects in the images, numbers of objects in the images, geolocation data associated with where the images were captured, and/or the like.

In some embodiments, the process flow 100 may include determining which features should be stored in the database. For example, the process flow 100 may include determining which features of the file are unidentified as compared to features of other files previously stored in the database.

In some embodiments, the process flow 100 may include using a machine learning model (e.g., a supervised machine learning model, an unsupervised machine learning model, a ridge regression model, an elastic net regression model, a least squares regression model, and/or the like) to determine which features of the file should be stored in the database. The machine learning model may be trained using the data in the database (e.g., the data from the first lot, the data from previously stored lots, and/or the like) to determine whether features (e.g., subsequent features) should be stored in the database. For example, the data in the database may indicate that every file from the first lot has feature A, and the process flow 100 may include determining (e.g., using the machine learning model) that, when storing files from the subsequent lots, feature A should not be stored because feature A is common to all of the files. Thus, by not storing feature A for every file from subsequent lots, the process flow 100 may reduce an amount of memory resources required to store data associated with the files from the subsequent lots in the database.

In some embodiments, the process flow 100 may include training the machine learning model using data in the database to determine which features of the file should be stored in the database. For example, the machine learning model may be trained using the data from the first lot of files. In some embodiments, the process flow 100 may include training the machine learning model to determine, based on data in the database, a likelihood of a feature being previously unidentified, determine whether the likelihood satisfies a threshold, and determine, based on the likelihood satisfying the threshold, that the feature should be stored in the database. Additionally, or alternatively, the process flow 100 may include, after a respective lot of files has been stored in the database, retraining the machine learning model to determine whether features (e.g., subsequent features) should be stored in the database.

In some embodiments, some features may not be identical matches from one file to another, so the machine learning model may use thresholds to determine whether features should be stored in the database. For example, each file may be and/or include an image of a page from a book, magazine, article, and/or the like. In such files, the page number will be different in every image, so simply storing that feature, the page number, because the feature is different from other features stored in the database will result in every page number being stored in the database. In some embodiments, the machine learning model may instead use thresholds. For example, the machine learning model may be trained using a first lot of images that includes the first, for example, twenty pages. Based on this training, the machine learning model may learn that these features are numbers increasing by one for each file, and, rather than identifying the page numbers as a new feature in each image because they are different, the machine learning model may stop identifying the page numbers as a new feature for subsequent lots of files. By stopping identifying page numbers as a new feature for storage, the amount of data stored in the database is reduced.

As shown in block 155, the process flow 100 may include storing the identified features in the database as a surrogate for the file. For example, an intelligent data compression system may store the identified features in the database as a surrogate for the file. In some embodiments, the files may include high-resolution image files, and the process flow 100 may include storing the identified features in the database as a surrogate for the file by storing (i) a lower resolution image file, an image identifier corresponding to the file, and/or the like, and (ii) metadata including the identified one or more features. For example, the high-resolution image files may include images captured by cameras of an autonomous vehicle, and the metadata may include a number of people identified in each image, a number of objects identified in each image, a number of vehicles identified in each image, geolocation data of the autonomous vehicle when an image was captured, and/or the like. As another example, the high-resolution image files may include images captured by a microscope of a plurality of cells, and the metadata may include a number of cells identified in each image, a wavelength of light used to capture each image, an identifier of the microscope, types of cells, and/or the like. As yet another example, the high-resolution image files may include images of wafer devices, and the metadata may include a step of manufacturing during which an image was captured, a defect identified in the wafer device, a location of a defect identified in the wafer device, a type of defect identified in the wafer device, and/or the like.

As shown in block 160, the process flow 100 may include determining whether the file is the last file in the lot. Based on determining that the file is not the last file in the lot, the process flow 100 may include repeating the steps described herein with respect to blocks 130, 135, 140, 145, 150, 155, and 160 on a subsequent file from the lot as shown in FIG. 1. In other words, the process flow 100 may include iteratively, for each file of plurality of files in the lot and until each file of the plurality of files is represented in the database (e.g., features of the file, a surrogate for the file, and/or the like has been stored in the database), repeating the steps described herein with respect to blocks 130, 135, 140, 145, 150, 155, and 160 on the respective files.

Alternatively, based on determining that the file is the last file in the lot, the process flow 100 may include repeating the steps described herein with respect to blocks 125, 130, 135, 140, 145, 150, 155, and 160 to initiate the process flow 100 with respect to a subsequent lot as shown in FIG. 1. In other words, the process flow 100 may include iteratively, for each lot of the lots and until each lot has been represented in the database (e.g., features of the files of the lot, surrogates for the files of the lot, and/or the like have been stored in the database), repeating the steps described herein with respect to blocks 125, 130, 135, 140, 145, 150, 155, and 160 on the respective lots. After each file from each lot has been processed, compressed, and/or stored in the database, the process flow 100 may end.

In some embodiments, the process flow 100 may include receiving an indication of an error associated with a file of the plurality of files. For example, if the files are associated with wafer devices, the process flow 100 may include receiving an indication that one of the wafer devices is not performing properly, has failed, and/or the like. The process flow 100 may also include identifying (e.g., using a machine learning model) other files in the database associated with the error, generating a report including the other files and the identified one or more features of the other files, and providing the report to a user. For example, a machine learning model may be trained to receive error data, determine, based on the data in the database and the error data, a likelihood of other files in the database being associated with the error that generated the error data. The machine learning model may also be trained to determine, based on the likelihood satisfying a threshold, that one or more other files are associated with the error.

In some embodiments, the error may include an event (e.g., in the physical world) that occurs after the features from the files are stored in the database. In such embodiments, the process flow 100 may include receiving an indication of the error and information identifying a file and/or files associated with the error, and, even though the database does not include each and every feature from the files, one or more machine learning models and/or one or more data analysis systems and/or tools may use the database to provide meaningful information regarding other files that may be associated with the error. For example, if a wafer device being used in the field fails for an unknown reason, one or more users and/or systems may use data analytics techniques and/or machine learning on the database to determine if there are other chips with features similar to features of the wafer device that failed. In this way, the process flow 100 may store sufficient data in the database for downstream use (e.g., by data analytics systems and/or the like), while also reducing the amount of memory resources required to store the data in the database.

In some embodiments, the process flow 100 may include, when providing the report to a user, causing a system, a user device, and/or the like to display to the user a report including the error data, identifiers of the other files, one or more features of the other files, and/or one or more user input elements to receive input from the user. The process flow 100 may include receiving user input at the user input elements from the user and causing one or more actions to be taken with respect to the other files. For example, the one or more actions may include notifying a manufacturer, a customer, a supplier, and/or the like associated with the other files. As another example, the one or more actions may include causing one or more other systems to stop a manufacturing process associated with the other files. As yet another example, the one or more actions may include updating the database to include the error (e.g., for the file associated with the error, for the other files identified as potentially associated with the error, and/or the like) and retraining one or more machine learning models using the updated database. As yet another example, the one or more actions may include altering, adjusting, changing, modifying, and/or the like a process (e.g., a manufacturing process and/or the like) to reduce a likelihood of the error occurring.

The process flow 100 may include additional embodiments, such as any single embodiment or any combination of embodiments described above and/or in connection with one or more other processes described elsewhere herein. Although FIG. 1 shows example blocks of the process flow 100, in some embodiments, the process flow 100 may include additional blocks, fewer blocks, different blocks, or differently arranged blocks than those depicted in FIG. 1. Additionally, or alternatively, two or more of the blocks of process flow 100 may be performed in parallel and/or simultaneously.

FIG. 2 illustrates an example file 200 for storage in a database, in accordance with an embodiment of the invention. As shown in FIG. 2, the example file 200 is an image captured by a camera (e.g., a security camera, a camera of an autonomous vehicle, and/or the like) that includes a number of people identified in the image, as indicated via boxes 210-230. As noted, in some embodiments, rather than storing a file including the image and associated data in a database, an intelligent data compression system may store features identified in the file in the database as a surrogate for the file. For example, the intelligent data compression system may store a lower resolution version of the image, an identifier of the image (e.g., a unique file name), and/or the like as well as metadata including the identified features. Using the example file 200 as an example, the intelligent data compression system may store a lower resolution version of the image and the number of people identified in the image as metadata associated with the file as a surrogate for the file in the database.

FIG. 3 illustrates another example file 300 for storage in a database, in accordance with an embodiment of the invention. As shown in FIG. 3, the example file 300 includes multiple images 310-360 of cells each captured at different wavelengths of electromagnetic radiation and a composite image 370 combining the multiple images 310-360. Other data in the example file 300 (e.g., other than the images shown in FIG. 3) may include, for example, a number of cells identified in each of the multiple images 310-360 and/or in the composite image 370, a wavelength of light used to capture each of the multiple images 310-360, an identifier of a microscope used to capture the images 310-370, and/or the like. In such an example, the intelligent data compression system may store lower resolution versions of the images, identifiers of the images (e.g., unique file names), and/or the like as well as metadata including the number of cells identified, the wavelengths of light, the identifier of the microscope, and/or the like as a surrogate for the file in the database.

FIG. 4 illustrates another example file 400 for storage in a database, in accordance with an embodiment of the invention. As shown in FIG. 4, the example file 400 includes an image of a wafer device (e.g., a vertical-cavity surface-emitting laser, a photodiode, and/or the like) and a plurality of identified features. For example, the identified features may include a p contact 403, an N-metal ring 429, a P mesa 434, a P-metal ring 435, an N-metal neck 441, a P-metal neck 471, a street 478, a window 483, a P pad 498, and an N pad 499. As another example, the identified features may include one or more visual defects (e.g., that do not match ideal images) indicative of cracks, particles, layer delamination, dots, and/or mask defects that may create an inconsistency in other features of the wafer device (e.g., the p contact 403, the N-metal ring 429, the P mesa 434, the P-metal ring 435, the N-metal neck 441, the P-metal neck 471, the street 478, the window 483, the P pad 498, and/or the N pad 499). In some embodiments, the example file 400 may also include metadata representing a step of manufacturing during which the image was captured, a defect identified in the wafer device, a location of a defect identified in the wafer device, a type of defect identified in the wafer device, results of tests performed on the wafer device, and/or the like.

As noted, in some embodiments, rather than storing a file including the image and associated data in a database, an intelligent data compression system may store features identified in the file in the database as a surrogate for the file. For example, the intelligent data compression system may store a lower resolution version of the image of the wafer device, an identifier of the image of the wafer device (e.g., a unique file name), and/or the like as well as metadata including the identified features. Using the example file 400 as an example, the intelligent data compression system may store a lower resolution version of the image of the wafer device, a list of the features identified in the image, a list of names, types, and locations of defects in the wafer device, a process used to manufacture the wafer device, one or more machines used to manufacture the wafer device, and/or the like as a surrogate for the file in the database.

By storing such a surrogate rather than the entire file, the intelligent data compression system may conserve the memory resources required to store the file, while preserving the unique and/or important information associated with the file. By preserving the unique and/or important information associated with the file, downstream systems accessing the file (e.g., for processing, for further analysis, for storage in another database, and/or the like) may consume fewer processing resources, memory resources, power resources, communication resources, network resources, and/or the like. Furthermore, if an error occurs in the field with respect to one of the wafer devices, a system may query the database to identify other wafer devices similar to the wafer device that experienced the error and take one or more corrective actions.

The files processed, compressed, and/or stored in accordance with the foregoing process flows may include additional embodiments, such as any single embodiment or any combination of embodiments described above and/or in connection with one or more other processes described elsewhere herein. Although FIGS. 2-4 show example files 200, 300, and 400, in some embodiments, the files may include additional images, features, test results, characteristics, attributes, and/or the like. Additionally, or alternatively, the files processed by the intelligent data compression system may include combinations of types of files to be stored in databases.

FIG. 5 illustrates a system environment 500 for intelligent data compression, in accordance with an embodiment of the invention. As shown in FIG. 5, the system environment 500 may include a file capturing device 510, a network 520, a data structure 530, an intelligent data compression platform 540, and a cloud computing environment 550 with computing resources 555. Devices of environment 500 may interconnect via wired connections, wireless connections, or a combination of wired and wireless connections.

In some embodiments, the file capturing device 510 may include one or more devices capable of receiving, generating, storing, processing, displaying, providing, and/or scanning files. For example, the file capturing device 510 may include one or more sensors for capturing images of objects, such as cells, tissue samples, minerals, products, wafer devices, documents, and/or the like. The one or more sensors may include a camera, an image sensor, an infrared camera, a laser sensor, and/or any other suitable sensor that may capture one or more images and/or data. Additionally, or alternatively, the file capturing device 510 may receive files from other systems and/or devices for storage in the data structure 530. In some embodiments, the file capturing device 510 may intercept files being transmitted from other systems and/or devices to the data structure 530 for storage.

The network 520 may include one or more wired and/or wireless networks. For example, the network 520 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The data structure 530 may include any type of data structure (e.g., a database, an array, a linked list, a record, a hash table, and/or the like) for storing files. In some embodiments, the data structure 530 may be maintained on-site with the file capturing device 510. Additionally, or alternatively, the data structure 530 may be cloud-based and may be stored remotely from the file capturing device 510.

In some embodiments, the intelligent data compression platform 540 may include one or more computing resources assigned to receive files, identify data points, identify features, train machine learning models, store files in the data structure 530, and/or the like, as described herein (e.g., with respect to FIG. 1 and process flow 100). For example, the intelligent data compression platform 540 may be a platform implemented by the cloud computing environment 550 that may receive files, identify data points, identify features, train machine learning models, store files in the data structure 530, and/or the like. In some embodiments, the intelligent data compression platform 540 may be implemented by computing resources 555 of the cloud computing environment 550.

The intelligent data compression platform 540 may include a server device or a group of server devices. In some embodiments, intelligent data compression platform 540 may be hosted in cloud computing environment 550. Notably, while embodiments described herein describe the intelligent data compression platform 540 as being hosted in cloud computing environment 550, in some embodiments, the intelligent data compression platform 540 may be non-cloud-based or may be partially cloud-based.

The cloud computing environment 550 may include an environment that delivers computing as a service, whereby shared resources, services, etc. may be provided to other devices, such as the file capturing device 510. The cloud computing environment 550 may provide computation, software, data access, storage, and/or other services that do not require end-user knowledge of a physical location and configuration of a system and/or a device that delivers the services. As shown, the cloud computing environment 550 may include the intelligent data compression platform 540 and the computing resource 555.

The computing resource 555 may include one or more personal computers, workstation computers, server devices, or another type of computation and/or communication device. In some embodiments, the computing resource 555 may host the intelligent data compression platform 540. The cloud resources may include compute instances executing in the computing resource 555, storage devices provided in the computing resource 555, data transfer devices provided by the computing resource 555, etc. In some embodiments, the computing resource 555 may communicate with other computing resources 555 via wired connections, wireless connections, or a combination of wired and wireless connections.

As further shown in FIG. 5, the computing resource 555 may include a group of cloud resources, such as one or more applications ("APPs") 555-1, one or more virtual machines ("VMs") 555-2, virtualized storage ("VSs") 555-3, one or more hypervisors ("HYPs") 555-4, or the like.

The application 555-1 may include one or more software applications that may be provided to or accessed by devices, such as the file capturing device 510. The application 555-1 may eliminate a need to install and execute the software applications on devices, such as the file capturing device 510. For example, the application 555-1 may include software associated with the intelligent data compression platform 540 and/or any other software capable of being provided via the cloud computing environment 550. In some embodiments, one application 555-1 may send and/or receive information to and/or from one or more other applications 555-1 via virtual machine 555-2.

The virtual machine 555-2 may include a software implementation of a machine (e.g., a computer) that executes programs like a physical machine. The virtual machine 555-2 may be either a system virtual machine or a process virtual machine, depending upon use and degree of correspondence to any real machine by the virtual machine 555-2. A system virtual machine may provide a complete system platform that supports execution of a complete operating system ("OS"). A process virtual machine may execute a single program and may support a single process. In some embodiments, the virtual machine 555-2 may execute on behalf of a user (e.g., devices, such as the file capturing device 510, the intelligent data compression platform 540, and/or the like) and may manage infrastructure of the cloud computing environment 550, such as data management, synchronization, or long-duration data transfers.

The virtualized storage 555-3 may include one or more storage systems and/or one or more devices that use virtualization techniques within the storage systems or devices of the computing resource 555. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 555-4 may provide hardware virtualization techniques that allow multiple operating systems (e.g., "guest operating systems") to execute concurrently on a host computer, such as the computing resource 555. The hypervisor 555-4 may present a virtual operating platform to the guest operating systems and may manage the execution of the guest operating systems. Multiple instances of a variety of operating systems may share virtualized hardware resources.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally or alternatively, a set of devices (e.g., one or more devices) of the environment 500 may perform one or more functions described as being performed by another set of devices of the environment 500.

FIG. 6 is a diagram of example components of a device 600. In some embodiments, the device 600 may correspond to the intelligent data compression system, the intelligent data compression platform, and/or the file capturing device described herein with respect to FIGS. 1-5. Additionally or alternatively, the intelligent data compression system, the intelligent data compression platform, and/or the file capturing device described herein with respect to FIGS. 1-5 may include one or more devices 600 and/or one or more components of the device 600. As shown in FIG. 6, the device 600 may include a bus 610, a processor 620, a memory 630, a storage component 640, an input component 650, an output component 660, and a communication interface 670.

Bus 610 may include a component that permits communication among multiple components of the device 600. The processor 620 may be implemented in hardware, firmware, and/or a combination of hardware and software. The processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 620 may include one or more processors capable of being programmed to perform a function. The memory 630 may include a random access memory (RAM), a read only memory (ROM), and/or another type of dynamic or static storage device (e.g., a flash memory, a magnetic memory, and/or an optical memory) that stores information and/or instructions for use by the processor 620.

The storage component 640 may store information and/or software related to the operation and use of the device 600. For example, the storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

The input component 650 may include a component that permits the device 600 to receive information, such as via user input (e.g., a touch screen display, a keyboard, a keypad, a mouse, a button, a switch, and/or a microphone). Additionally or alternatively, the input component 650 may include a component for determining location (e.g., a global positioning system (GPS) component) and/or a sensor (e.g., an accelerometer, a gyroscope, an actuator, another type of positional or environmental sensor, and/or the like). The output component 660 may include a component that provides output information from the device 600 (via, e.g., a display, a speaker, a haptic feedback component, an audio or visual indicator, and/or the like).

The communication interface 670 may include a transceiver-like component (e.g., a transceiver, a separate receiver, a separate transmitter, and/or the like) that enables the device 600 to communicate with other devices, such as via a wired connection, a wireless connection, or a combination of wired and wireless connections. The communication interface 670 may permit the device 600 to receive information from another device and/or provide information to another device. For example, the communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

The device 600 may perform one or more processes described herein. The device 600 may perform these processes based on the processor 620 executing software instructions stored by a non-transitory computer-readable medium, such as the memory 630 and/or the storage component 640. As used herein, the term "computer-readable medium" refers to a non-transitory memory device. A memory device includes memory space within a single physical storage device or memory space spread across multiple physical storage devices.

Software instructions may be read into the memory 630 and/or the storage component 640 from another computer-readable medium or from another device via the communication interface 670. When executed, software instructions stored in the memory 630 and/or the storage component 640 may cause the processor 620 to perform one or more processes described herein. Additionally, or alternatively, hardware circuitry may be used in place of or in combination with software instructions to perform one or more processes described herein. Thus, embodiments described herein are not limited to any specific combination of hardware circuitry and software.

The number and arrangement of components shown in FIG. 6 are provided as an example. In practice, the device 600 may include additional components, fewer components, different components, or differently arranged components than those shown in FIG. 6. Additionally or alternatively, a set of components (e.g., one or more components) of the device 600 may perform one or more functions described as being performed by another set of components of the device 600.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor and/or a processing device, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium and/or a non-transitory storage device, such as a tangible electronic, magnetic, optical, electromagnetic, infrared, and/or semiconductor system, device, and/or other apparatus. For example, in some embodiments, the non-transitory computer-readable medium and/or the non-transitory storage device may include a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for intelligent data compression, the system comprising:
at least one processing device; and
at least one non-transitory storage device comprising computer-executable program code that, when executed by the at least one processing device, causes the at least one processing device to:
receive a plurality of files for storage in a database, wherein each file of the plurality of files comprises data; and
iteratively, for each file of the plurality of files and until each file of the plurality of files is represented in the database, compress a respective file into a surrogate to reduce an amount of memory resources required to store the data of the respective file in the database by:
identifying, using a first machine learning model, one or more data points in the respective file, wherein each identified data point was previously unidentified with respect to a stored file in the database;
adding the identified one or more data points to the database;
identifying, using a second machine learning model, one or more features of the respective file for storage in the database; and
storing the identified one or more features in the database as the surrogate for the respective file.

2. The system of claim 1, wherein the first machine learning model is an unsupervised machine learning model.

3. The system of claim 1, wherein the first machine learning model is a one-class support vector machine trained using a radial basis function kernel.

4. The system of claim 1, wherein the second machine learning model is an unsupervised machine learning model.

5. The system of claim 1, wherein the second machine learning model is at least one of a ridge regression model, an elastic net regression model, or a least squares regression model.

6. The system of claim 1, wherein the plurality of files is a second plurality of files, and wherein the at least one non-transitory storage device comprises computer-executable program code that, when executed by the at least one processing device, causes the at least one processing device to, before receiving the second plurality of files:
receive a first plurality of files for storage in the database;
identify data points in each of the first plurality of files;
add the identified data points to the database;
identify features in each of the first plurality of files; and
store, for each of the first plurality of files, the identified features in the database as a surrogate for the respective file.

7. The system of claim 6, wherein the at least one non-transitory storage device comprises computer-executable program code that, when executed by the at least one processing device, causes the at least one processing device to, before receiving the second plurality of files, train the first machine learning model using data in the database to determine whether subsequent data points are previously unidentified data points.

8. The system of claim 7, wherein training the first machine learning model to determine whether subsequent data points are previously unidentified data points comprises training the first machine learning model to:
determine, based on data in the database, a likelihood of a data point being previously unidentified;
determine whether the likelihood satisfies a threshold; and
identify, based on the likelihood satisfying the threshold, that the data point is a previously unidentified data point.

9. The system of claim 7, wherein the at least one non-transitory storage device comprises computer-executable program code that, when executed by the at least one processing device, causes the at least one processing device to, after a surrogate for each file of the second plurality of files is stored in the database and using the identified data points of the first plurality of files and the identified data points of the second plurality of files, retrain the first machine learning model to determine whether subsequent data points are previously unidentified data points.

10. The system of claim 6, wherein the at least one non-transitory storage device comprises computer-executable program code that, when executed by the at least one processing device, causes the at least one processing device to, before receiving the second plurality of files, train the second machine learning model using data in the database to determine whether subsequent features should be stored in the database.

11. The system of claim 10, wherein training the second machine learning model to determine whether subsequent features should be stored in the database comprises training the second machine learning model to:
determine, based on data in the database, a likelihood of a feature being previously unidentified;
determine whether the likelihood satisfies a threshold; and
determine, based on the likelihood satisfying the threshold, that the feature should be stored in the database.

12. The system of claim 10, wherein the at least one non-transitory storage device comprises computer-executable program code that, when executed by the at least one processing device, causes the at least one processing device to, after a surrogate for each file of the second plurality of files is stored in the database and using the identified features of the first plurality of files and the identified features of the second plurality of files, retrain the second machine learning model to determine whether subsequent features should be stored in the database.

13. The system of claim 1, wherein the files comprise high-resolution image files, and wherein storing the identified one or more features in the database as a surrogate for the file comprises storing (i) at least one of a lower resolution image file or an image identifier corresponding to the file and (ii) metadata comprising the identified one or more features.

14. The system of claim 13, wherein the at least one non-transitory storage device comprises computer-executable program code that, when executed by the at least one processing device, causes the at least one processing device to:
receive an indication of an error associated with a file of the plurality of files;
identify, using a third machine learning model, other files in the database associated with the error;
generate a report comprising the other files and the identified one or more features of the other files; and
provide the report to a user.

15. The system of claim 13, wherein the high-resolution image files comprise images captured by one or more cameras of an autonomous vehicle, and the metadata comprises at least one of a number of people identified in each image, a number of objects identified in each image, or a number of vehicles identified in each image.

16. The system of claim 13, wherein the high-resolution image files comprise images captured by a microscope of a plurality of cells, and the metadata comprises at least one of a number of cells identified in each image, a wavelength of light used to capture each image, or an identifier of the microscope.

17. The system of claim 13, wherein the high-resolution image files comprise images of wafer devices, and the metadata comprises at least one of a step of manufacturing during which an image was captured, a defect identified in the wafer device, a location of a defect identified in the wafer device, or a type of defect identified in the wafer device.

18. A method for intelligent data compression, the method comprising:
receiving a first plurality of files for storage in a database;
identifying data points in each of the first plurality of files;
adding the identified data points to the database;
identifying features in each of the first plurality of files;
storing, for each of the first plurality of files, the identified features in the database as a surrogate for the respective file;
receiving a second plurality of files for storage in the database; and
iteratively, for each file of the second plurality of files and until each file of the second plurality of files is represented in the database, compress a respective file into a surrogate to reduce an amount of memory resources required to store the data of the respective file in the database by:
identifying, using a first machine learning model, one or more data points in the respective file, wherein each identified data point was previously unidentified with respect to a stored file in the database;
adding the identified one or more data points to the database;
identifying, using a second machine learning model, one or more features of the respective file for storage in the database; and
storing the identified one or more features in the database as the surrogate for the respective file.

19. The method of claim 18, wherein the first machine learning model is an unsupervised, one-class support vector machine trained using a radial basis function kernel, and wherein the second machine learning model is an unsupervised, ridge regression model.

20. The method of claim 18, comprising, before receiving the second plurality of files:
training the first machine learning model using data in the database to determine whether data points are previously unidentified data points; and
training the second machine learning model using data in the database to determine whether features should be stored in the database.

* * * * *